United States Patent
Tang et al.

(10) Patent No.: US 8,197,018 B2
(45) Date of Patent: Jun. 12, 2012

(54) COMPUTER ENCLOSURE

(75) Inventors: Zi-Ming Tang, Shenzhen (CN); Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 272 days.

(21) Appl. No.: 12/582,854

(22) Filed: Oct. 21, 2009

(65) Prior Publication Data

US 2011/0012483 A1 Jan. 20, 2011

(30) Foreign Application Priority Data

Jul. 20, 2009 (CN) .......................... 2009 1 0304556

(51) Int. Cl.
*A47B 81/00* (2006.01)
(52) U.S. Cl. ................. 312/223.2; 292/138; 292/259 R; 361/679.57
(58) Field of Classification Search ............... 312/223.2, 312/223.1, 265.5, 263, 215, 222, 216–218; 292/1, DIG. 11, 137, 138, 259 R, DIG. 63, 292/DIG. 68, 32, 41, 162, 163, 174, DIG. 37, 292/3, 42, 74, 87, 128, 129, 101, 102, 106, 292/107, 170, 175, 179, 145, 146, 150, 152, 292/271–273, 277, 302, 341; 361/679.01, 361/679.02, 679.57, 679.6, 724–727
See application file for complete search history.

(56) References Cited

U.S. PATENT DOCUMENTS

| | | | | |
|---|---|---|---|---|
| 1,508,029 | A * | 9/1924 | Segal | 292/57 |
| 4,322,101 | A * | 3/1982 | Kelly et al. | 292/260 |
| 4,746,152 | A * | 5/1988 | Willcox | 292/150 |
| 5,465,191 | A * | 11/1995 | Nomura et al. | 361/679.27 |
| 5,746,455 | A * | 5/1998 | Takimoto | 292/62 |
| 6,398,325 | B1 * | 6/2002 | Chen et al. | 312/223.2 |
| 6,907,830 | B2 * | 6/2005 | Guinan et al. | 109/24.1 |
| 7,108,135 | B2 * | 9/2006 | Park | 206/711 |
| 7,164,578 | B2 * | 1/2007 | Wang et al. | 361/679.08 |
| 7,172,222 | B1 * | 2/2007 | Hotovy | 292/57 |
| 7,193,855 | B2 * | 3/2007 | Fan et al. | 361/724 |
| 7,261,383 | B2 * | 8/2007 | Fan et al. | 312/223.2 |
| 7,480,132 | B2 * | 1/2009 | Wu et al. | 361/679.27 |
| 2001/0019212 | A1 * | 9/2001 | Fujiwara | 292/175 |
| 2005/0017608 | A1 * | 1/2005 | Lin et al. | 312/223.2 |
| 2005/0152120 | A1 * | 7/2005 | Lee | 361/725 |
| 2006/0125585 | A1 * | 6/2006 | Lo et al. | 335/285 |
| 2006/0133025 | A1 * | 6/2006 | Wu et al. | 361/683 |
| 2009/0108593 | A1 * | 4/2009 | Lee | 292/164 |
| 2009/0315341 | A1 * | 12/2009 | Willcox | 292/163 |

* cited by examiner

*Primary Examiner* — David Dunn
*Assistant Examiner* — Ryan A Doyle
(74) *Attorney, Agent, or Firm* — Altis Law Group, Inc.

(57) ABSTRACT

A computer enclosure includes a housing, a cover, a lock rod and an operating member. The housing includes an upper plate and a bottom plate opposite to the upper plate, with two protruding bars respectively formed on opposite inner surfaces of the upper plate and the bottom plate. Each protruding bar forms a latch hook and defines a notch. The cover forms a limiting portion defining a receiving groove. The lock rod is moveably received in the receiving groove. The operating member is slidably assembled onto the cover and fixed to the lock rod. The operating member is capable of moving the lock rod to pass through the notch and latch to or detach from the latch hook, such that the cover can be assembled onto or disassembled from the housing.

16 Claims, 8 Drawing Sheets

COMPUTER ENCLOSURE

BACKGROUND

1. Technical Field

The present disclosure relates to an enclosure for a computer.

2. Description of Related Art

A commonly used computer enclosure includes a housing and a cover. The housing defines a cavity to receive electronic components, such as a main board, a hard disk, and so on. The cover is fixed on an opening of the housing to enclose the cavity. Generally, the cover is fixed on the housing by screws or bolts. However, this can be inconvenient for assembly or removal, because screws or bolts must be fastened or removed one by one. In addition, the computer enclosure may easily deform after repeated assembly and disassembly.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
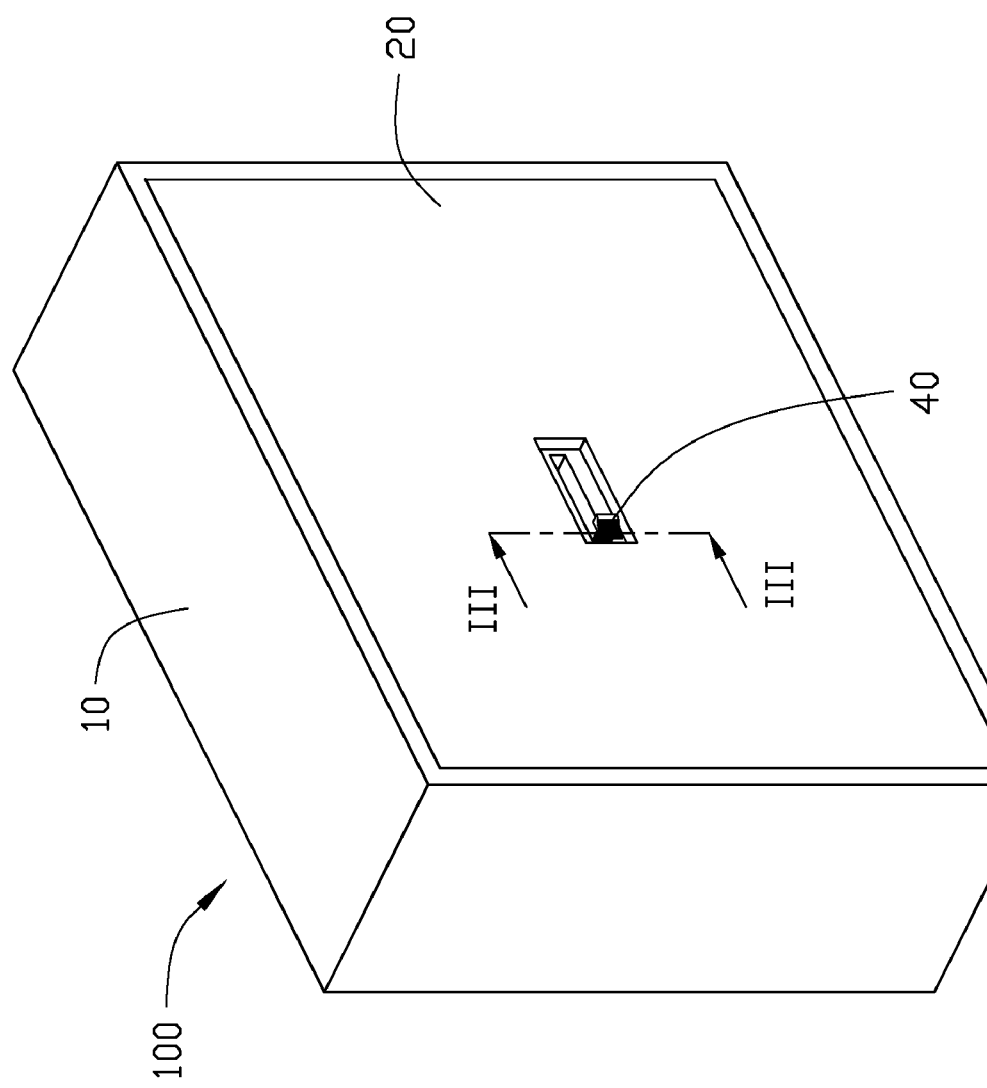
FIG. 1 is an assembled, isometric view of an embodiment of a computer enclosure.
Figure 2:
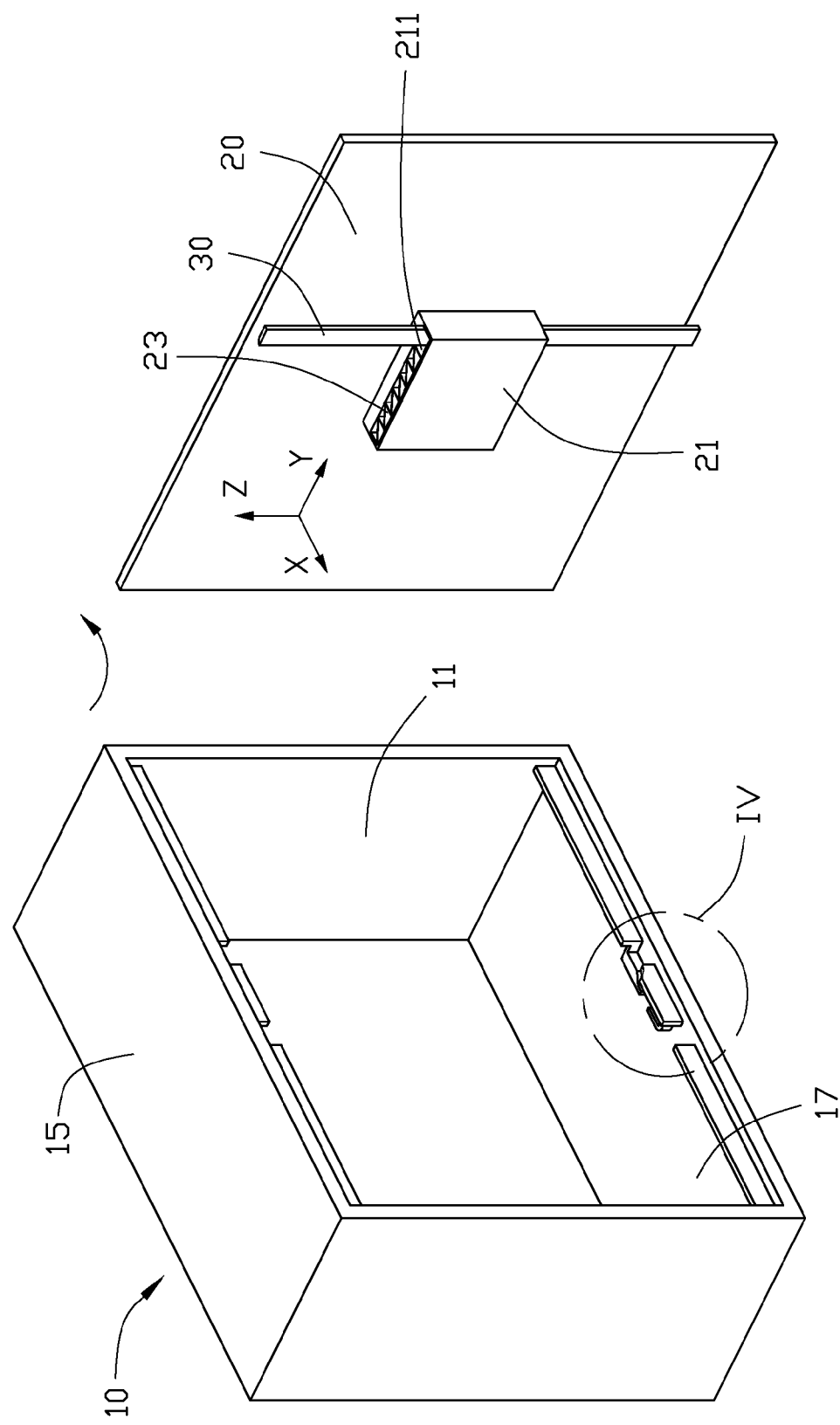
FIG. 2 is a partially exploded, isometric view of the computer enclosure in FIG. 1.

Referring to FIGS. 1 and 2, an embodiment of a computer enclosure 100 includes a housing 10, a cover 20, a lock rod 30 and an operating member 40. The housing 10 defines an opening 11 in a sidewall thereof. The lock rod 30 is assembled onto an inner surface of the cover 20. The operating member 40 is assembled onto an outer surface of the cover 20 to latch the lock rod 30 in the housing 10, thus fixing the cover 20 on the sidewall of the housing 10 adjacent to the opening 11.

Figure 3:
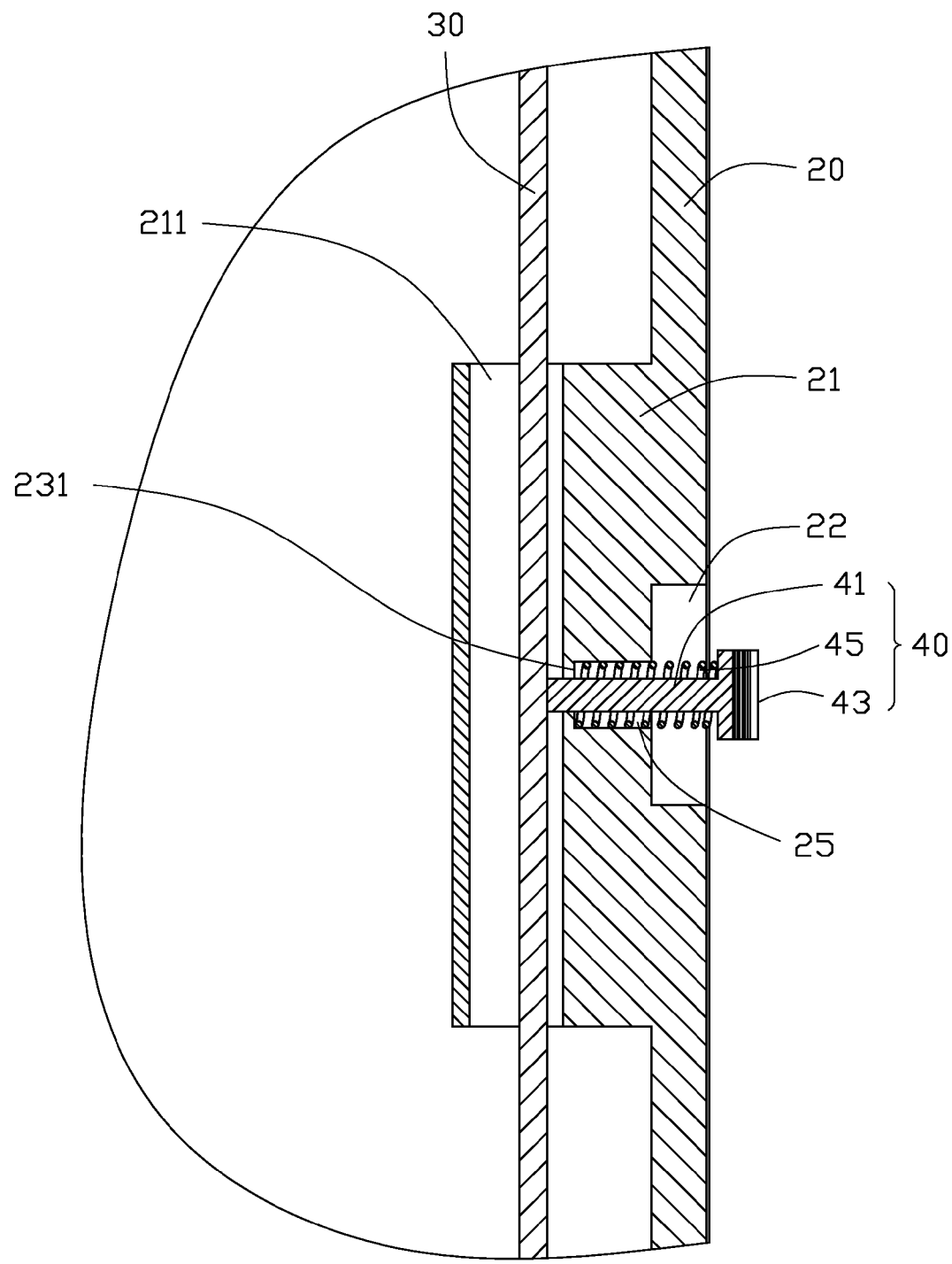
FIG. 3 is a partial cross section of the computer enclosure taken along line III-III in FIG. 1.

Referring also to FIG. 3, the cover 20 is a substantially rectangular plate, and forms a limiting portion 21 on an inner surface thereof. The limiting portion 21 is a substantially rectangular block, and defines a receiving groove 211 extending along the axis Y and extending through the limiting portion 21 along the axis Z. A resilient member 23 is positioned in the receiving groove 211. As shown, the resilient member 23 is substantially pleated, but may alternatively be a helical spring, a plurality of spring washers, or any resilient mechanism. The lock rod 30 is received through the receiving groove 211. A first end of the resilient member 23 abuts a sidewall of the receiving groove 211, and a second end of the resilient member 23 abuts the lock rod 30. A width of the receiving groove 211 along the axis X exceeds the thickness of the lock rod 30, thus the lock rod 30 can move along the axis X in the receiving groove 211. The lock rod 30 can also move along the axis Y in the receiving groove 211 to compress or release the resilient member 23.

The cover 20 defines a sliding groove 22 in the outer surface. The limiting portion 21 defines a sliding hole 25 extending through the bottom surface of the sliding groove 22 and communicates with the receiving groove 211. A stopper 231 is formed on a sidewall of the sliding hole 25 adjacent to the receiving groove 211. The operating member 40 includes an operating rod 41, an operating portion 43, and an elastic member 45. The operating rod 41 is slidably received in the sliding hole 25 and fixed to the lock rod 30. The operating portion 43 is formed on an end of the operating rod 41 away from the lock rod 30 and can be received in the sliding groove 22. As shown, the elastic member 45 is a helical spring, with one end abutting the stopper 231, and the other end abutting the operating portion 43.

Figure 4:
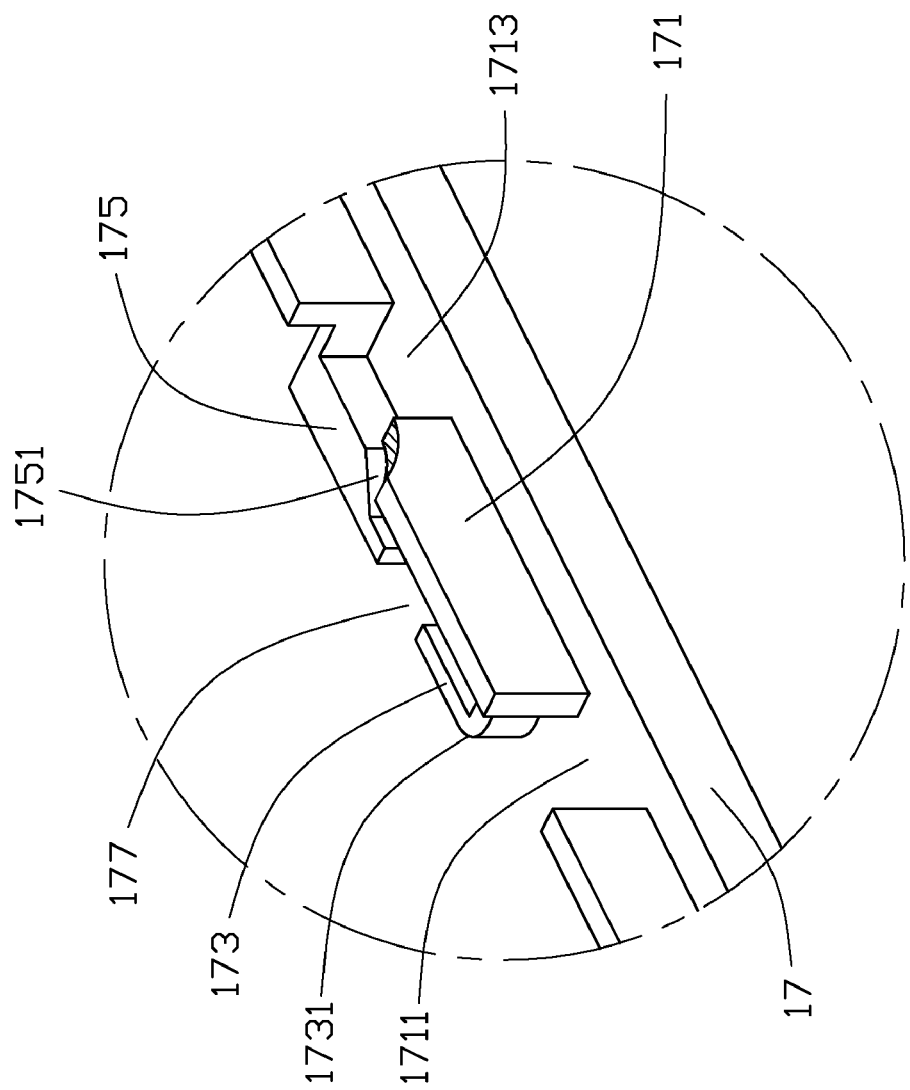
FIG. 4 is an enlarged view of a portion IV of the computer enclosure in FIG. 2.
Figure 5:
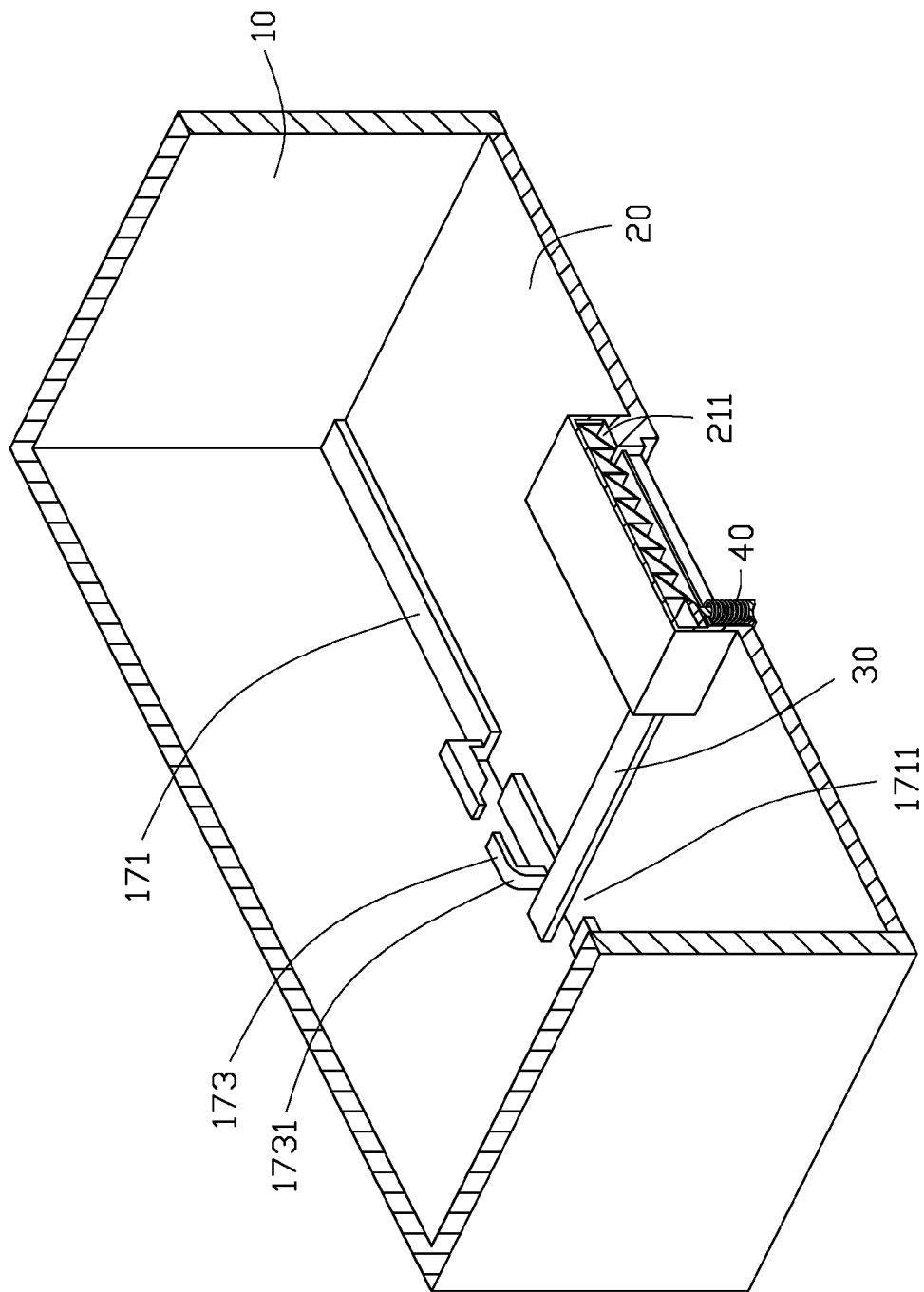
FIGS. 5 through 8 are isometric cross sections of the computer enclosure in FIG. 1, showing different working states of the computer enclosure.
Figure 6:
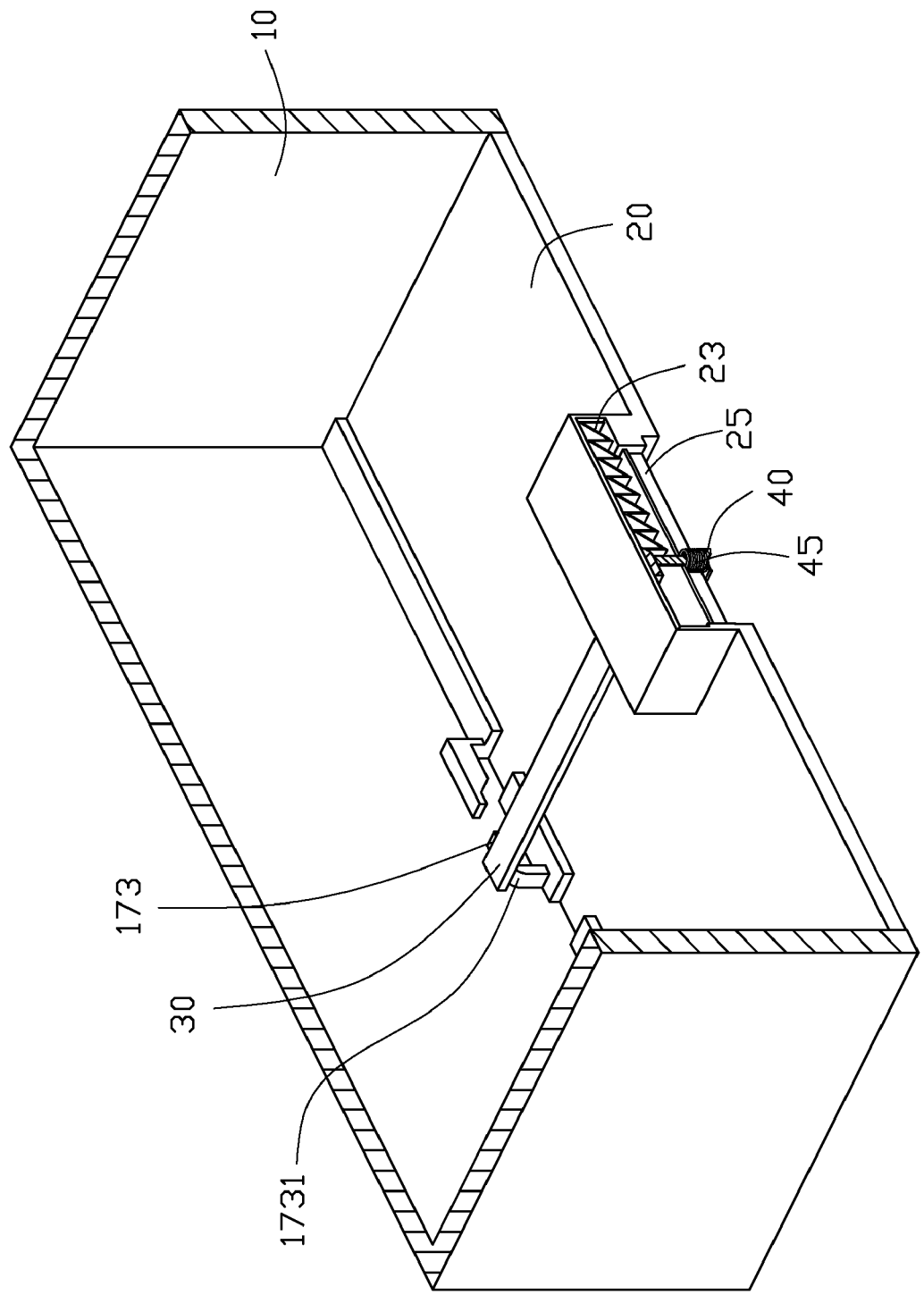
Figure 7:
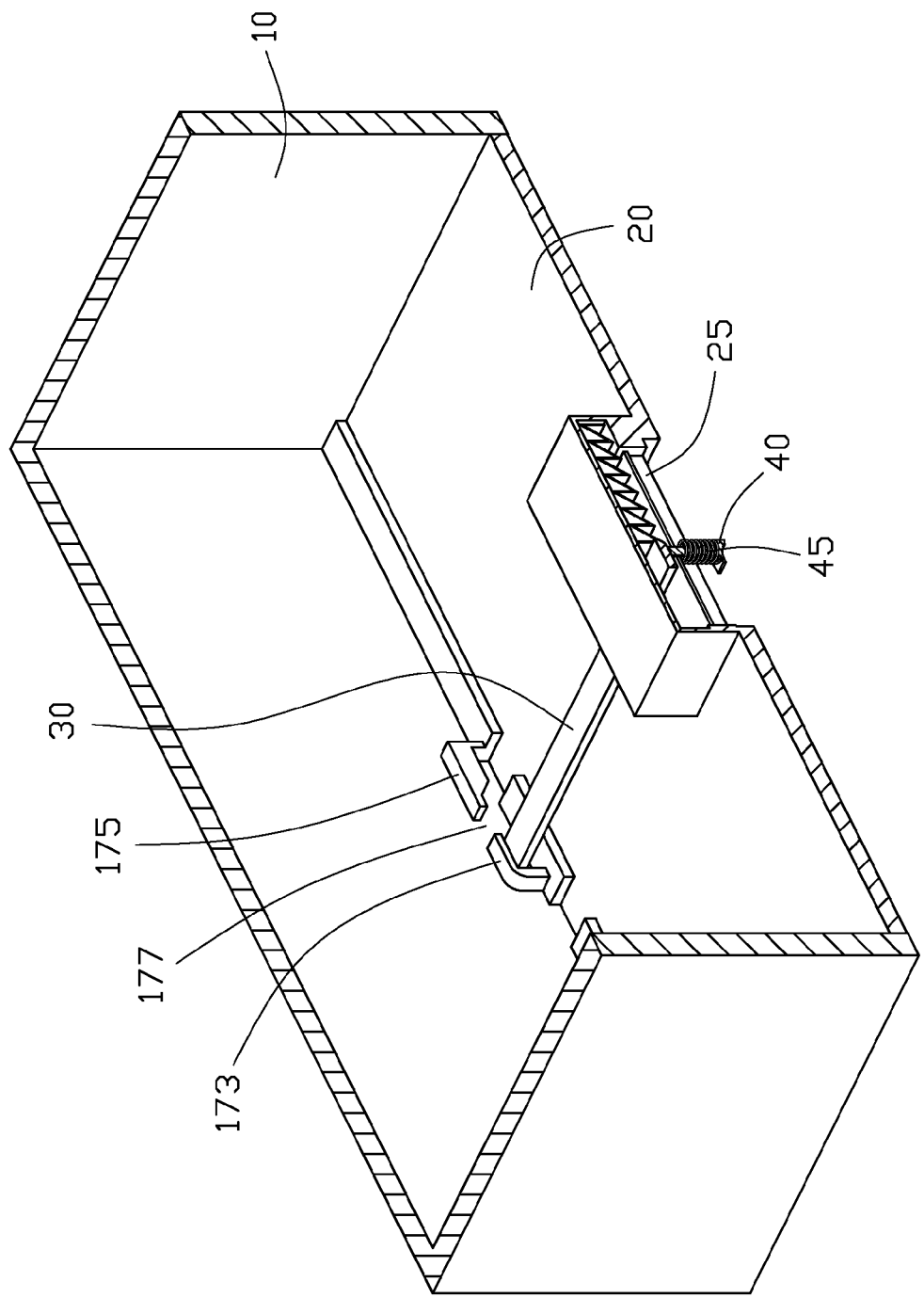
Figure 8:
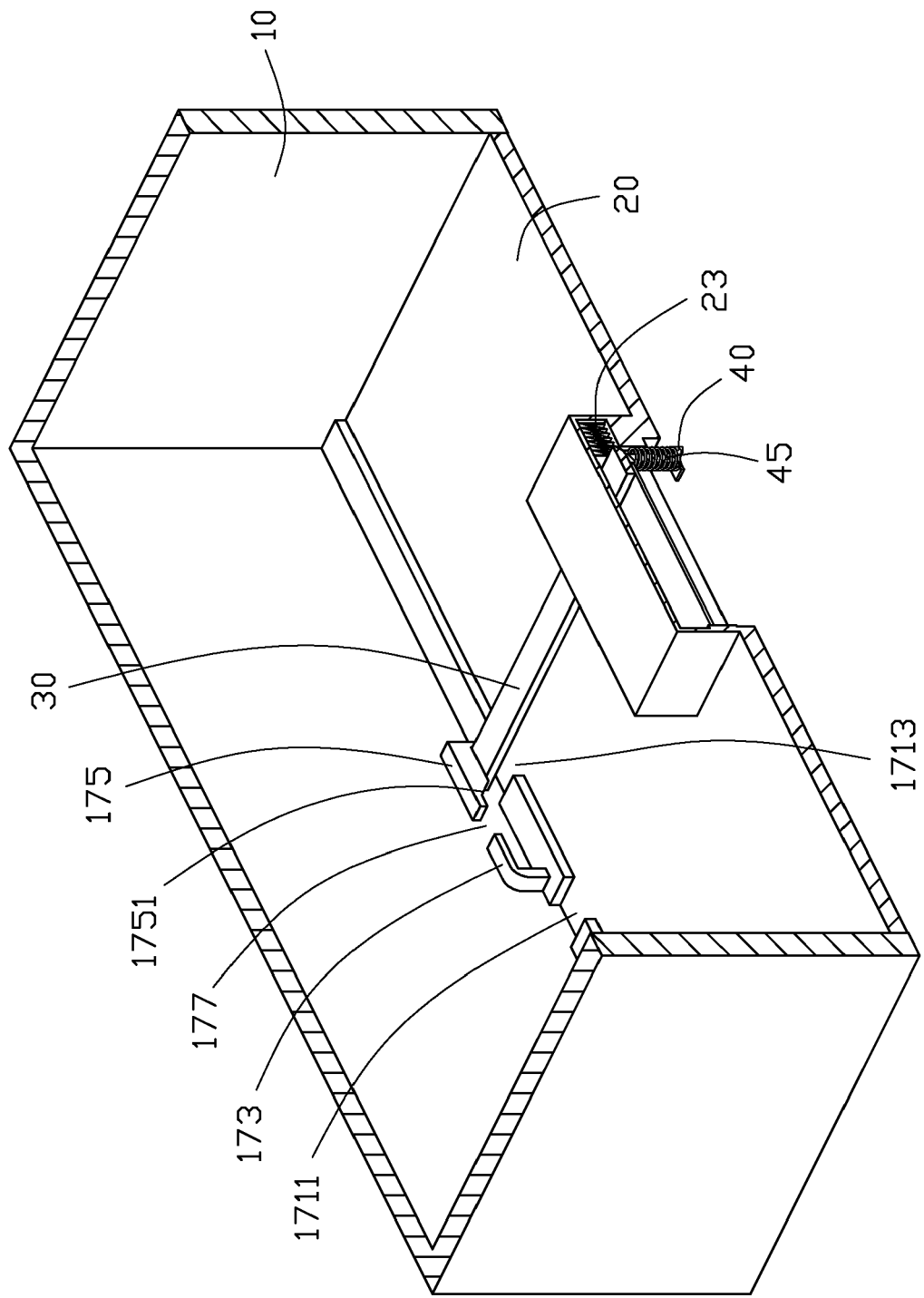

Referring also to FIG. 4, the housing 10 includes an upper plate 15 and a bottom plate 17. The bottom plate 17 forms a protruding bar 171 on an inner surface adjacent to the opening 11. The protruding bar 171 defines a first notch 1711 and a second notch 1713 which are both wider than the lock rod 30, thereby enabling the lock rod 30 to pass therethrough. The protruding bar 171 forms a latch hook 173 on an inner side between the first and second notches 1711, 1713. The latch hook 173 is adjacent to the first notch 1711, and is bent towards the second notch 1713. The latch hook 173 has a curved guide surface 1731. The protruding bar 171 further forms a guide block 175 on the inner side adjacent to the second notch 1713. The guide block 175 has an angled surface 1751 angling towards the latch hook 173. A gap 177 defined between the latch hook 173 and the guide block 175, is also wider than the lock rod 30, enabling the lock rod 30 to pass therethrough. The upper plate 15 is substantially the same as the bottom plate 17.

Referring to FIGS. 5 through 8, for the purposes of brevity, only half of the computer enclosure 100 is shown and described, the other half of the computer enclosure 100 being assembled or disassembled in the same way as the portion illustrated.

The cover 20 can be assembled onto the housing 10 as follows. The cover 20 is positioned adjacent to the opening 11 of the housing 10. The lock rod 30 passes through the first notch 1711. The operating member 40 is impelled by an external force to move the lock rod 30 towards the latch hook 173. The resilient member 23 is compressed by the lock rod 30. When the lock rod 30 contacts the latch hook 173, the lock rod 30 moves on top of the latch hook 173 via the guide surface 1731. The elastic member 45 is compressed by the operating portion 43. The operating member 40 continues to be impelled by external force to move the lock rod 30 to reach the gap 177, at which time the external force ceases. The lock rod 30 passes through the gap 177 by an elastic force generated by the elastic member 45, and latches in the latch hook 173 by the elastic force generated by the resilient member 23. The cover 20 is thus stably assembled onto the housing 10.

Alternatively, the cover 20 can be assembled onto the housing 10 in another manner in which the operating member 40 is impelled by an external force to move the lock rod 30 corresponding to the second notch 1713. The resilient member 23 is compressed by the lock rod 30. The cover 20 is then received in the opening 11 of the housing 10. The lock rod 30 passes through the second notch 1713, and latches in the latch hook 173 by an elastic force generated by the resilient member 23. The cover 20 is thus stably assembled onto the housing 10.

The cover 20 can be disassembled from the housing 10 as follows. The operating member 40 is impelled by an external force to move the lock rod 30 corresponding to the gap 177. The operating member 40 is then impelled to move the lock rod 30 through the gap 177. The lock rod 30 then moves towards the first notch 1711 by an elastic force generated by the resilient member 23. When the lock rod 30 moves to correspond with the first notch 1711, the cover 20 can be easily removed from the housing 10.

Alternatively, the cover 20 can be disassembled from the housing 10 in another manner in which the operating member 40 is impelled by an external force to move the lock rod 30 towards the guide block 175. When contacting the guide block 175, the lock rod 30 easily moves to correspond to the second notch 1713 via the angled surface 1751, such that the cover 20 is easily removed from the housing 10.

In assembling and disassembling, the guide block 175 and the second notch 1713 may be omitted. Alternatively, the guide block 175 and the first notch 1711 may be omitted.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A computer enclosure, comprising:
a housing comprising an upper plate and a bottom plate opposite to the upper plate, wherein two protruding bars are respectively formed on opposite inner surfaces of the upper plate and the bottom plate, each protruding bar forming a latch hook and defining a notch;
wherein each protruding bar further forms a guide block comprising an angled surface angling towards the latch hook; the notch is defined between the latch hook and the guide block;
a cover forming a limiting portion, the limiting portion defining a receiving groove;
a lock rod moveably received in the receiving groove; and
an operating member slidably assembled onto the cover and fixed to the lock rod, and capable of moving the lock rod through the notch and latching to or detaching from the latch hook, such that the cover can be assembled onto or disassembled from the housing.

2. The computer enclosure of claim 1, further comprising a resilient member positioned in the receiving groove of the limiting portion, wherein one end of the resilient member abuts a sidewall of the receiving groove and the other end of the resilient member abuts the lock rod.

3. The computer enclosure of claim 1, wherein the cover defines a sliding groove; the limiting portion defines a sliding hole extending through the bottom surface of the sliding groove and communicates with the receiving groove; the cover forms a stopper on a sidewall of the sliding hole adjacent to the receiving groove.

4. The computer enclosure of claim 3, wherein the operating member comprises an operating rod received in the sliding hole and fixed to the lock rod, an operating portion formed on an end of the operating rod away from the lock rod, and an elastic member comprising one end abutting the stopper and the other end abutting the operating portion.

5. The computer enclosure of claim 1, wherein the latch hook comprises a curved guide surface; the notch is defined adjacent to the latch hook.

6. A computer enclosure, comprising:
a housing forming two protruding bars on opposite inner surfaces, each protruding bar forming a latch hook and a guide block, each protruding bar defining a first notch adjacent to the latch hook and a second notch adjacent to the guide block, the second notch positioned between the latch hook and the guide block, the latch hook and the guide block cooperatively defining a gap therebetween;
a cover forming a limiting portion, the limiting portion defining a receiving groove;
a lock rod moveably received in the receiving groove;
an operating member slidably assembled onto the cover and fixed to the lock rod; and
wherein the operating member is capable of moving the lock rod to pass through the first notch and latch to the latch hook, thus assembling the cover onto the housing; wherein the operating member is also capable of moving the lock rod to detach from the latch hook and pass through the second notch, thus disassembling the cover from the housing.

7. The computer enclosure of claim 6, further comprising a resilient member positioned in the receiving groove of the limiting portion, wherein one end of the resilient member abuts a sidewall of the receiving groove and the other end of the resilient member abuts the lock rod.

8. The computer enclosure of claim 6, wherein the cover defines a sliding groove; the limiting portion defines a sliding hole extending through the bottom surface of the sliding groove and communicates with the receiving groove; the cover forms a stopper on a sidewall of the sliding hole adjacent to the receiving groove.

9. The computer enclosure of claim 8, wherein the operating member comprises an operating rod received in the sliding hole and fixed to the lock rod, an operating portion formed on an end of the operating rod away from the lock rod, and an elastic member comprising one end abutting the stopper and the other end abutting the operating portion.

10. The computer enclosure of claim 6, wherein the latch hook comprises a curved guide surface.

11. The computer enclosure of claim 6, wherein the guide block comprises an angled surface angling towards the latch hook.

12. A computer enclosure, comprising:
a housing forming two protruding bars on opposite inner surfaces, each protruding bar forming a latch hook and defining a notch;
wherein each protruding bar further forms a guide block comprising an angled surface angling towards the latch hook; the notch is defined between the latch hook and the guide block and adjacent to the guide block;
a cover forming a limiting portion, the limiting portion defining a receiving groove;
a resilient member positioned in the receiving groove;
a lock rod moveably received in the receiving groove and abutting the resilient member; and
an operating member slidably assembled onto the cover and fixed to the lock rod, the operating member being capable of moving the lock rod to pass through the notch and latch to or detach from the latch hook, such that the cover can be assembled onto or disassembled from the housing.

13. The computer enclosure of claim 12, wherein the resilient member is substantially pleated.

14. The computer enclosure of claim 12, wherein the cover defines a sliding groove; the limiting portion defines a sliding hole extending through the bottom surface of the sliding groove and communicates with the receiving groove; the cover forms a stopper on a sidewall of the sliding hole adjacent to the receiving groove.

15. The computer enclosure of claim 14, wherein the operating member comprises an operating rod received in the sliding hole and fixed to the lock rod, an operating portion formed on one end of the operating rod away from the lock rod, and an elastic member comprising one end abutting the stopper and the other end abutting the operating portion.

16. The computer enclosure of claim 12, wherein the latch hook comprises a curved guide surface; the notch is defined adjacent to the latch hook.

* * * * *